United States Patent
Kullmann et al.

(10) Patent No.: US 9,162,299 B2
(45) Date of Patent: Oct. 20, 2015

(54) SAW BLADE FOR SAWING HOLLOW PROFILES AND FORM PROFILES

(75) Inventors: Jörg H. Kullmann, Spangenberg (DE);
Patrick Gleim, Homberg/Efze (DE);
Martin Hentschel, Spangenberg (DE)

(73) Assignee: WIKUS-SAEGENFABRIK WILHELM H. KULLMANN GMBH & CO. KG, Spangenberg (DE)

( * ) Notice: Subject to any disclaimer, the term of this patent is extended or adjusted under 35 U.S.C. 154(b) by 796 days.

(21) Appl. No.: 13/464,000

(22) Filed: May 4, 2012

(65) Prior Publication Data

US 2012/0279372 A1     Nov. 8, 2012

(30) Foreign Application Priority Data

May 6, 2011  (DE) .................... 10 2011 050 168

(51) Int. Cl.
*B23D 61/12*     (2006.01)
(52) U.S. Cl.
CPC ........... *B23D 61/121* (2013.01); *Y10T 83/9346* (2015.04)
(58) Field of Classification Search
CPC ............................. B23D 61/021; B23D 61/121
USPC .................................................. 83/835–855
See application file for complete search history.

(56) References Cited

U.S. PATENT DOCUMENTS

| | | | |
|---|---|---|---|
| 5,425,296 A | 6/1995 | Kullmann | |
| 5,477,763 A | 12/1995 | Kullman | |
| 6,520,722 B2 * | 2/2003 | Hopper et al. | ................. 407/42 |
| 6,834,573 B1 | 12/2004 | Nakahara | |
| 2002/0170410 A1 * | 11/2002 | Gittel et al. | ..................... 83/835 |
| 2007/0163392 A1 | 7/2007 | Kullmann | |
| 2009/0126205 A1 * | 5/2009 | Kullmann et al. | ............. 30/347 |
| 2009/0126712 A1 | 5/2009 | Kullmann | |

FOREIGN PATENT DOCUMENTS

| | | |
|---|---|---|
| DE | 43 00 622 A1 | 5/1995 |
| DE | 100 30 168 A1 | 1/2001 |
| DE | 201 08 238 U1 | 9/2001 |
| EP | 1808250 A1 | 7/2007 |
| EP | 2060355 A2 | 5/2009 |

(Continued)

OTHER PUBLICATIONS

European Search Report dated Jul. 23, 2012.

*Primary Examiner* — Laura M Lee
(74) *Attorney, Agent, or Firm* — Thomas | Horstemeyer, LLP

(57) ABSTRACT

A saw blade (1) serves for sawing hollow profiles and form profiles. The saw blade (1) is especially designed as saw band, and it includes a base body (2) and a plurality of teeth (10). The teeth (10) are formed by protrusions (3) and inserts (4). The teeth (10) are arranged in a group being repeated along the saw blade (1). The group includes at least three unset chamfered teeth (10). The group includes a first tooth (C1) having two chamfers ($FC1_1$, $FC1_2$) being symmetric to the longitudinal center plane (9) of the saw blade (1), a second tooth (C2) having two chamfers ($FC2_1$, $FC2_2$) being non-symmetric to the longitudinal center plane (9) and a third tooth (C3) having two chamfers ($FC3_1$, $FC3_2$) being non-symmetric to the longitudinal center plane (9).

19 Claims, 4 Drawing Sheets

(56) References Cited

FOREIGN PATENT DOCUMENTS

| | | |
|---|---|---|
| FR | 2841806 A1 | 1/2004 |
| JP | 2002263327 | 9/2000 |
| JP | 2008132594 A | 6/2008 |
| WO | 96/21545 A1 | 7/1996 |

* cited by examiner

SAW BLADE FOR SAWING HOLLOW PROFILES AND FORM PROFILES

CROSS REFERENCE TO RELATED APPLICATIONS

This application claims priority to co-pending German Patent Application No. DE 10 2011 050 168.1 entitled "Sägeblatt zum Sägen von Hohl- and Formprofilen", filed May 6, 2011.

FIELD OF THE INVENTION

The present invention generally relates to a saw blade for sawing hollow profiles and/or form profiles. The saw blade includes a base body and a plurality of teeth being connected to the base body, each of the teeth including a cutting portion. The teeth are formed by protrusions being connected to the base body. Each tooth includes an insert being connected to the respective protrusion. The insert is made of a material being harder than the material of the protrusions and of the base body. At least a part of the teeth is arranged in a group of teeth being repeated along the length of the base body and including at least three unset teeth.

Such saw blades may be especially designed as elongated saw band including a linear arrangement of the teeth one after the other, as hacksaw blade or as circular saw blade. The base body is made of metal and the teeth are preferably at least partly made of hard metal. In this way, the saw blade is especially suitable for sawing metal.

BACKGROUND OF THE INVENTION

A saw blade including a base body and a plurality of teeth being connected to the base body is known from German Patent Application No. DE 42 00 423 A1, corresponding to U.S. Pat. No. 5,477,763 A and U.S. Pat. No. 5,425,296 A. The teeth include a cutting portion. The teeth are arranged in a group being repeated along the length of the base body, the group at least including three unset chamfered teeth having different widths and heights. Each tooth in the group has two chamfers being arranged to be symmetric with respect to the longitudinal center plane of the saw blade. Due to this special group design including unset teeth, one attains especially great cutting power while the straight movement of the saw blade during sawing is stabilized. This reduces the danger of undesired lateral movement of the saw blade during sawing. In this way, the saw blade substantially differs from other known saw blades including set teeth or saw blades according to the pre-cutter and finishing cutter geometry.

Another similar saw blade is known from German Patent Application No. DE 43 00 622 A1, corresponding to U.S. Pat. No. 5,477,763 A and U.S. Pat. No. 5,425,296 A.

A saw blade including a base body and a plurality of teeth being connected to the base body is also known from German Patent Application No. DE 100 30 168 A1, corresponding to U.S. Pat. No. 6,834,573 B1. Each tooth includes a cutting portion. The teeth are alternately unset, set towards the left side and set towards the right side. In this way, all teeth—or at least the set teeth—have identical widths and heights.

Other saw blades are known from Japanese Patent Application No. JP 2008132594 A, PCT-application WO 1996/021545 A1, German Utility Model DE 201 08 238 U1 and U.S. Pat. No. 6,520,722 B2.

SUMMARY OF THE INVENTION

The present invention relates to a saw blade for sawing hollow profiles and form profiles. The saw blade has a longitudinal center plane. The saw blade includes a base body and a plurality of teeth, the teeth being connected to the base body and including a cutting portion. Each tooth includes a protrusion being connected to the base body and an insert being connected to the protrusion, the protrusion being made of a first material and the insert being made of a second material, the second material being harder than the first material. At least a part of the teeth is arranged along the saw blade in a group, the group being repeated along the saw blade, the group including at least three unset chamfered teeth. A first tooth in the group includes a first chamfer and a second chamfer, the first and second chamfer extending symmetrically with respect to the longitudinal center plane. A second tooth in the group includes a first chamfer and a second chamfer, the first and second chamfer extending non-symmetrically with respect to the longitudinal center plane, the first chamfer extending in a first direction from the longitudinal center plane and having a first chamfer angle, the second chamfer extending in a second direction from the longitudinal center plane, the second direction being different than the first direction, the second chamfer having a second chamfer angle, the second chamfer angle being greater than the first chamfer angle. A third tooth in the group includes a first chamfer and a second chamfer, the first and second chamfer extending non-symmetrically with respect to the longitudinal center plane, the first chamfer extending in the first direction from the longitudinal center plane and having a first chamfer angle, the second chamfer extending in a second direction from the longitudinal center plane, the second direction being different than the first direction, the second chamfer having a second chamfer angle, the second chamfer angle being smaller than the first chamfer angle.

The first chamfer angle of the second tooth may be—but does not have to be—identical to the second chamfer angle of the third tooth. The second chamfer angle of the second tooth may be—but does not have to be—identical to the first chamfer angle of the third tooth.

DEFINITIONS

The teeth of the novel saw blade are arranged in the sense of a special form of the so called "group design" according to which the group of teeth includes at least three teeth. The group is repeated along the length of the saw blade, possibly by an intermediate arrangement of other teeth. Such a special group design is to be clearly differentiated from the known pre-cutter and finishing cutter design and also from a simple repeated arrangement of an unset tooth, a tooth being set towards the left side and a tooth being set towards the right side.

Designating the teeth in the sense of "first" tooth, "second" tooth and so forth primarily only serves to differentiate the teeth and does not mean that the teeth are arranged at the saw blade in this order. However, another disclosed possibility is that the teeth are exactly arranged in this order—possibly by an intermediate arrangement of additional teeth.

Due to its special geometry, the novel saw blade is especially suitable for sawing hollow profiles and form profiles, especially of metal. However, this does not mean that it is not possible to saw other workpieces with the novel saw blade.

The teeth of the saw blade are designed such that they are suitable for cutting various profiles—especially separately or combined as a multitude of layers or bundles—and especially for cutting steel beams being designed as hollow profiles and/or form profile.

The saw blade may be especially designed as an elongated saw band including a linear arrangement of the teeth one after the other, as hacksaw blade or as circular saw blade.

FURTHER DESCRIPTION

Compared to known saw blades including unset symmetrically chamfered teeth in the group, the novel tooth geometry of the novel saw blade provides many advantages. When sawing hollow profiles or form profiles, the different chamfers of a part of the teeth result in the burr being located at the workpiece being neatly and uniformly cut when the saw blade passes through the cutting channel and exits the cutting channel, respectively.

The free cut required for effective cutting with the saw blade is realized by a special way of grinding the chamfers of the teeth and thus their cutting portions.

It is disadvantageous in prior art saw blades including set teeth that there are setting tolerances resulting in irregular overlaps of the teeth resulting in the cutting channel having a varying shape and cut surfaces including burrs. The distribution of the volume of material to be removed by cutting and of the cutting forces acting upon the teeth vary. This may influence the desired straight movement of the saw blade in a negative way. It also results in reduced quality of the cut surface. Furthermore, the base body of the saw blade is weakened by setting due to the deflection from the longitudinal center plane such that the great forces occurring during cutting with great cutting power cannot be distributed to the base body. This may result in the teeth and the carrier material at least partly breaking.

The novel saw blade has a number of advantages compared to this prior art. The teeth and their cutting portions are designed in a way that one realizes cutting with less vibrations during sawing. This resulting in less burrs. In this way, reworking measures at the cut workpiece are not required or at least less required. To attain a very uniform wide cutting channel and to prevent deviations, the teeth are not set. Instead, some teeth have a symmetric design caused by grinding making it possible to realize exact cuts (i.e. cuts with small form deviations) and a smooth and neatly cut surface also when using the saw blade for a comparatively long period of time.

Producing the novel saw blade is less expensive compared to prior art saw blades which are set since the additional step of setting can be omitted.

There is a great number of possibilities for arranging the teeth and for the order of the teeth, respectively. To reduce the vibration sensitivity of the saw blade, the distances between adjacent teeth can be varied, and they may be chosen to be uniform or varying.

The teeth preferably have a positive rake angle, and especially a rake angle of approximately between 1° to 20°, especially approximately 10°.

The teeth may have different widths and preferably also different heights. The highest tooth has the smallest width, the smallest tooth has the greatest width and so forth. Such an arrangement is designated as "width and height graduation". A specific portion of the cutting channel is associated with each tooth. The height of the symmetric first tooth may be between approximately 0.02 mm and 0.2 mm, especially approximately 0.03 mm, greater than the height of the non-symmetric second and third teeth. The chamfer angle of the symmetric first tooth is in a region of approximately between 20° and 60°, especially approximately 45°. The non-symmetric teeth have chamfer angles of between approximately 5° and 45°, the chamfer angles being coordinated in a way that the loads acting upon the teeth during sawing are approximately uniformly distributed. Due to the above described chamfer angles, one attains a very stable corner of the respective tooth.

The group of teeth may include one or more additional unset chamfered teeth. One of these teeth is a fifth tooth including two chamfers extending non-symmetrically with respect to the longitudinal center plane of the saw blade. The first chamfer extends in a first direction from the longitudinal center plane and has a first chamfer angle. The second chamfer extends in a different second direction from the longitudinal center plane, and it has a smaller second chamfer angle. A sixth tooth includes two chamfers extending non-symmetrically with respect to the longitudinal center plane of the saw blade. The first chamfer extends in a first direction from the longitudinal center plane, and it has a first chamfer angle. The second chamfer extends in a different second direction from the longitudinal center plane, and it has a greater second chamfer angle. Due to the increase of the number of unset non-symmetrically chamfered teeth—possibly with an intermediate arrangement of additional symmetrically chamfered teeth—the portions in the cutting channel to be cut by the respective tooth are further reduced such that the cutting forces are even more uniformly distributed. Thus, lower forces act upon the respective tooth and the quality of the cut surface is further improved. This effect is attained by a clever coordination of the chamfer angles.

It is preferred that there are unset non-symmetrically chamfered teeth in the group having chamfer angles that another tooth also has, but in an inverted arrangement. In other words, a first tooth has a first chamfer angle in the left portion of its cutting portion and a different second chamfer angle in the right portion of its cutting portion. A different second tooth has this second chamfer angle in the left portion of its cutting portion and this first chamfer angle in the right portion of its cutting portion. The plurality of unset symmetrically chamfered teeth preferably have identical chamfer angles—especially of approximately 45°—, and they have different heights and/or different widths.

The saw blade is designed as a saw blade including inserts being made of hard metal, the inserts being connected to protrusions being connected to the base body. These hard metal inserts result in increased hardness and resistance when sawing with the saw blade compared to high-speed steel (HSS). The inserts are designed as form bodies which are produced as separate elements and which are then permanently connected to the protrusions—especially by welding, soldering or brazing.

The teeth of the saw blade include cutting portions having a geometrically defined shape (in contrast to cutting portions of a geometrically undefined shape; see DIN 8580). Preferably, the cutting portions of the saw blade are made of hard metal, meaning especially steel alloyed with tungsten and/or cobalt. In this connection, tungsten is the actual hard material and cobalt—as well as possible other alloying elements—is the binder. However, it is also possible to use other super-speed steels or other materials.

For further increasing the hardness and wear resistance of the saw blade, the saw blade may at least be partly covered with a wearing protection layer. The wearing protection layer extends at least over the cutting edge of the cutting portion. It is possible that the cutting portion has been rounded before to improve adhesion of the wearing protection layer. The wearing protection layer especially provides for a greater hardness and thus improved resistance against abrasion during sawing. In this way, the usable lifetime of the saw blade is increased. Furthermore, it is possible that the coefficient of friction of the wearing protection layer is chosen to be comparatively low to achieve easy removal of the chips during sawing and thus reduced warming of the saw blade. At the same time, the cutting forces are reduced compared to saw blades not including a wearing protection layer.

The wearing protection layer may be made of hard material. Such hard material is especially to be understood as TiN, TiCN, TiAlN, CrN or DLC. The protection layer may include one or more layers. If the protection layer only includes one layer, it is especially made of TiN, TiCN, TiAlN or CrN. It is also possible that a plurality of layers—especially two, three or four layers—together form the wearing protection layer. In case of such a multilayer design, an intermediate layer is especially made of TiN, TiCN, TiAlN or CrN and the surface layer being arranged on the intermediate layer is especially made of DLC. The wearing protection layer is preferably deposited by a physical vapor deposition process (PVD). In case of a multilayer design, this applies both to the surface layer as well as to the at least one intermediate layer.

The teeth may have various designs concerning their widths, their chamfer angles and the lengths of the chamfers. For example, at least a part of the teeth—and especially the so called leading tooth—may be designed such that it is not wider than the base body of the saw blade. For example, this is achieved by a comparatively great chamfer angle. Such a tooth then has a width of zero in the group of teeth.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
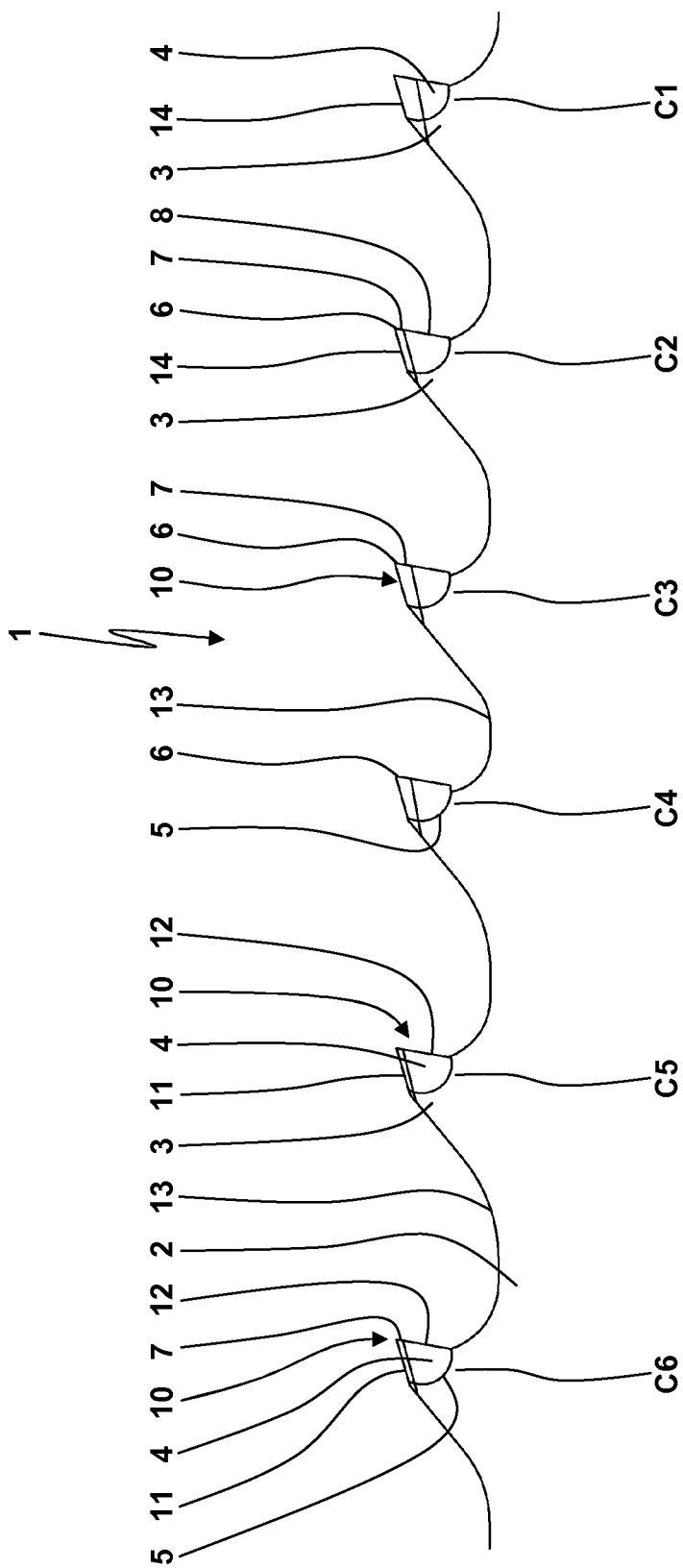
FIG. 1 is a schematic side view of a part of a first exemplary embodiment of the novel saw blade.
Figure 2:
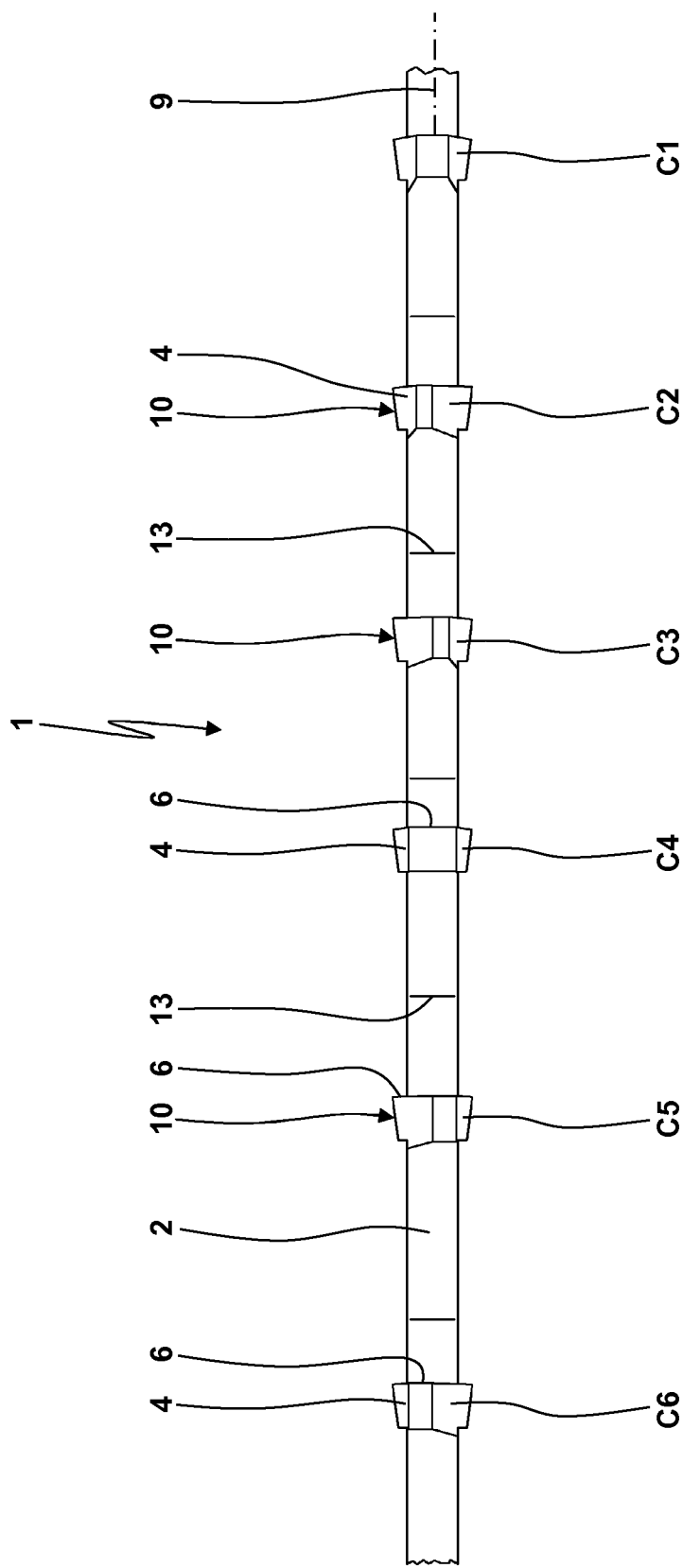
FIG. 2 is a top view of the saw blade according to FIG. 1.
Figure 3:
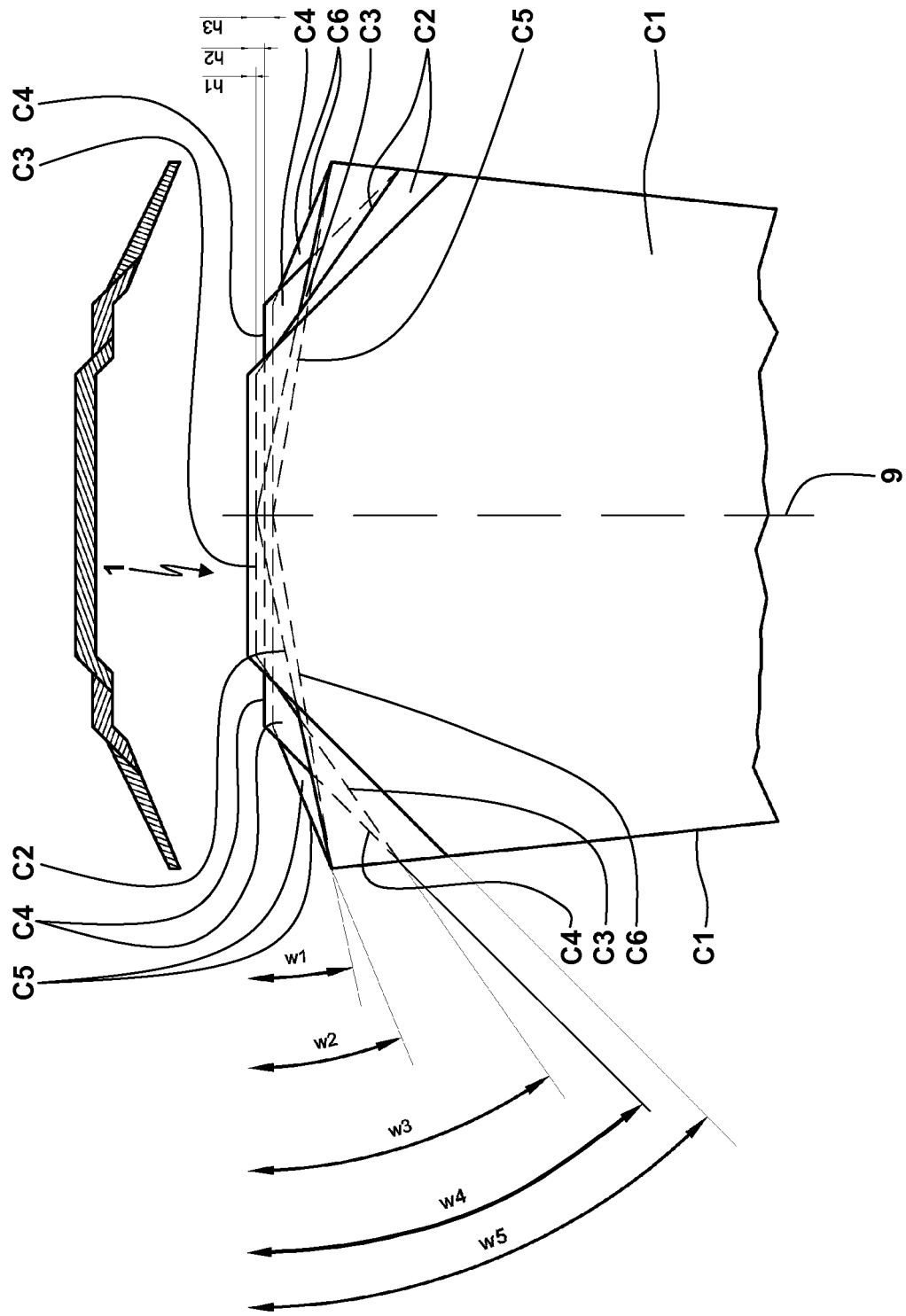
FIG. 3 is a front view of the saw blade according to FIG. 1.
Figure 4:
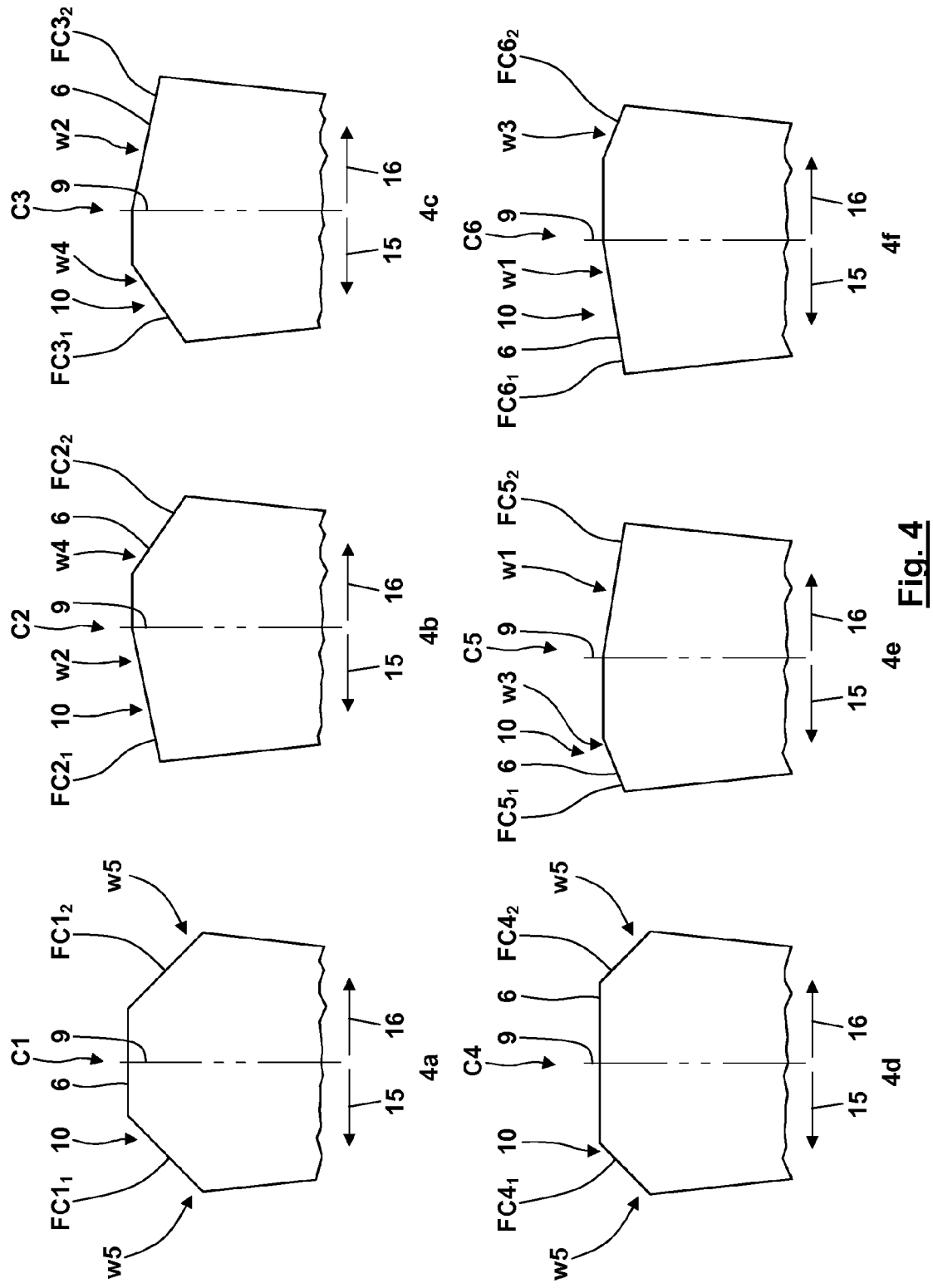
FIG. 4 illustrates enlarged front views of exemplary embodiments of the teeth of the novel saw blade according to FIG. 1.

Referring now in greater detail to the drawings, FIG. 1 is a side view of a first exemplary embodiment of the novel saw blade 1. FIG. 2 illustrates the corresponding top view of the saw blade 1. Further views of the saw blade 1 illustrated in FIGS. 1 and 2 and of its components are illustrated in FIGS. 3 and 4. FIGS. 4a to 4f illustrate the six teeth 10 of the saw blade 1 according to FIG. 3 separately.

For describing the saw blade 1, it is referred to FIGS. 1-4 in the following. It is to be understood that FIGS. 1 and 2 only illustrate a portion of the saw blade 1. The saw blade 1 actually extends further towards the left and the right as well as in a downward direction. In FIGS. 1 and 2, the saw blade 1 is designed as an elongated saw band having a longitudinal center plane 9. The longitudinal center plane 9 extends in the center along the length of the saw blade 1, as this can be fully understood when also considering FIGS. 2 and 3 (see reference numerals 9). However, the saw blade 1 could also be designed as a circular saw blade or as a less long hacksaw blade. The saw blade 1 is made of metal and especially serves to saw metal.

The saw blade 1 includes a base body 2 of which only a portion is to be seen in the illustrations. The base body 2 is connected to a plurality of protrusions 3 each being connected to an insert 4. The base body 2 and the protrusions 3 are designed as one piece. The insert 4 is made of a material being harder than the material of the protrusions 3 and of the base body 2 of the saw blade 1. Preferably, the material of the insert is hard metal. There is a connecting surface 5 between the protrusion 3 and the insert 4 at which the insert 4 is connected to the protrusion 3—especially by welding, soldering or brazing. The saw blade 1 is not illustrated in natural size, but instead such that the inserts 4 are to be better seen. In reality, the inserts 4 are actually significantly smaller compared to the protrusions 3.

The protrusion 3 with the insert 4 forms the tooth 10 including a cutting portion 6 and a chip forming surface 7. Furthermore, each tooth 10 includes a tooth back 11, a tooth face 12, a tooth base 13 and a free surface 14.

At least a part of the teeth 10 are arranged in a group being repeated along the length of the base body 2. The group at least includes three unset chamfered teeth 10. In the upper portion of FIG. 3, the hatching illustrates the special distribution of the effective regions of the cutting portions 6 of a plurality of teeth 10. Each of these regions is associated with a certain strip-shaped portion of the cutting channel, and it only removes chips from that place.

As it is especially to be seen in FIGS. 3 and 4, the illustrated exemplary group includes six different teeth C1, C2, C3, C4, C5 and C6. There is a total number of five different chamfer angles w1, w2, w3, w4 and w5 being located to the left and to the right. However, for reasons of clarity of the illustrations, these angles have only been designated in the left portion of FIG. 3. However, it is to be understood that they also exist at the right hand side of the illustration, partly at different teeth 10.

The first tooth C1 is the highest and thinnest tooth 10, the so called leading tooth. The first tooth C1 in the group includes two chamfers (or bevels, bezels) $FC1_1$ and $FC1_2$ extending at a chamfer angle w5 extending symmetrically with respect to the longitudinal center plane 9 of the saw blade 1.

A second tooth C2 in the group includes two chamfers $FC2_1$ and $FC2_2$ extending non-symmetrically with respect to the longitudinal center plane 9 of the saw blade 1. The first chamfer $FC2_1$ extends in a first direction 15 from the longitudinal center plane 9, and it has a first chamfer angle w2. The second chamfer $FC2_2$ extends in a different second direction 16 from the longitudinal center plane 9, and it has a greater second chamfer angle w4.

A third tooth C3 in the group includes two chamfers $FC3_1$ and $FC3_2$ extending non-symmetrically with respect to the longitudinal center plane 9 of the saw blade 1. The first chamfer $FC3_1$ extends in the first direction 15 from the longitudinal center plane 9, and it has the first chamfer angle w4. The second chamfer $FC3_2$ extends in the other second direction 16 from the longitudinal center plane 9, and it has the smaller second chamfer angle w2.

A fourth tooth C4 in the group has two chamfers $FC4_1$ and $FC4_2$ extending symmetrically with respect to the longitudinal center plane 9 of the saw blade 1 at a chamfer angle w5.

A fifth tooth C5 in the group includes two chamfers $FC5_1$ and $FC5_2$ extending non-symmetrically with respect to the longitudinal center plane 9 of the saw blade 1. The first chamfer $FC5_1$ extends in the first direction 15 from the longitudinal center plane 9, and it has a chamfer angle w3. The second chamfer $FC5_2$ extends in the other second direction 16 from the longitudinal center plane 9, and it has a smaller second chamfer angle w1.

A sixth tooth C6 in the group has two chamfers $FC6_1$ and $FC6_2$ extending non-symmetrically with respect to the longitudinal center plane of the saw blade 1. The first chamfer $FC6_1$ extends in the first direction 15 from the longitudinal center plane 9, and it has the chamfer angle w1. The second chamfer $FC6_2$ extends in the other second direction 16 from the longitudinal center plane 9, and it has the greater second chamfer angle w3.

With such an arrangement of the teeth 10 in this special type of group design including unset teeth 10 having partly different non-symmetric chamfer angles, one attains especially great cutting power and straight movement of the saw blade 1, very exact cuts producing less burrs at the cut workpiece and a smooth and clean cut surface even over long action times of the saw blade 1 when sawing hollow profiles or form profiles.

Furthermore, the height differences h1, h2 and h3 between the teeth 10 are illustrated in FIG. 3.

In summary, the illustrated preferred exemplary embodiment of the saw blade 1 has the following values:

| tooth | height difference | chamfer angle 1 | chamfer angle 2 |
|---|---|---|---|
| C1 | — | w5 | w5 |
| C2 | h1 | w2 | w4 |
| C3 | h1 | w4 | w2 |
| C4 | h2 | w5 | w5 |
| C5 | h3 | w3 | w1 |
| C6 | h3 | w1 | w3 |

The following may apply:

| variable | value range 1 | value range 2 | preferred value |
|---|---|---|---|
| w1 | 5-25° | 5-15° | 9° |
| w2 | 5-25° | 8-20° | 12° |
| w3 | 10-30° | 15-30° | 22° |
| w4 | 20-50° | 30-40° | 35° |
| w5 | 20-60° | 40-50° | 45° |
| h1 | 0.01-0.3 mm | 0.02-0.2 mm | 0.03 mm |
| h2 | 0.02-0.6 mm | 0.04-0.4 mm | 0.06 mm |
| h3 | 0.03-0.9 mm | 0.06-0.6 mm | 0.09 mm |

As illustrated in FIG. 3, the group includes the order of teeth C1-C2-C3-C4-C5-C6 in this preferred exemplary embodiment. This group is repeated along the length of the saw blade 1. However, it is possible that other teeth 10 are arranged between these teeth 10 in the group and/or between the groups. It is also possible to vary the arrangement of the groups. Other possible examples are the arrangements in the order of the teeth C1-C5-C6-C4-C2-C3, C1-C6-C5-C4-C2-C3, C1-C6-C5-C4-C3-C2 and C1-C5-C6-C4-C3-C2.

Many variations and modifications may be made to the preferred embodiments of the invention without departing substantially from the spirit and principles of the invention. All such modifications and variations are intended to be included herein within the scope of the present invention, as defined by the following claims.

We claim:

1. A saw blade for sawing hollow profiles and form profiles, comprising:
    a longitudinal center plane,
    a base body, and
    a plurality of teeth, the teeth being connected to the base body and including a cutting portion,
        each tooth including a protrusion being connected to the base body and an insert being connected to the protrusion, the protrusion being made of a first material and the insert being made of a second material, the second material being harder than the first material,
        at least a part of the teeth being arranged along the saw blade in a group, the group being repeated along the saw blade, the group including at least three unset chamfered teeth,
        a first tooth in the group including a first chamfer and a second chamfer, the first and second chamfer extending symmetrically with respect to the longitudinal center plane,
        a second tooth in the group including a first chamfer and a second chamfer, the first and second chamfer extending non-symmetrically with respect to the longitudinal center plane, the first chamfer extending in a first direction from the longitudinal center plane and having a first chamfer angle, the second chamfer extending in a second direction from the longitudinal center plane, the second direction being different than the first direction, the second chamfer having a second chamfer angle, the second chamfer angle being greater than the first chamfer angle,
        a third tooth in the group including a first chamfer and a second chamfer, the first and second chamfer extending non-symmetrically with respect to the longitudinal center plane, the first chamfer extending in the first direction from the longitudinal center plane and having a first chamfer angle, the second chamfer extending in a second direction from the longitudinal center plane, the second direction being different than the first direction, the second chamfer having a second chamfer angle, the second chamfer angle being smaller than the first chamfer angle,
    the first chamfer of the second tooth and the first chamfer of the third tooth being designed and arranged to end in a first laterally outward common point as seen in a front view of the saw blade, and
    the second chamfer of the second tooth and the second chamfer of the third tooth being designed and arranged to end in a second laterally outward common point as seen in a front view of the saw blade.

2. The saw blade of claim 1, wherein
    the first chamfer angle of the second tooth is in a range of approximately between 5° and 25°,
    the second chamfer angle of the second tooth is in a range of approximately between 20° and 50°,
    the first chamfer angle of the third tooth is in a range of approximately between 20° and 50°, and
    the second chamfer angle of the third tooth is in a range of approximately between 5° and 25°.

3. The saw blade of claim 1, wherein the first tooth has a chamfer angle in a range of approximately between 20° and 60°.

4. The saw blade of claim 2, wherein the first tooth has a chamfer angle in a range of approximately between 20° and 60°.

5. The saw blade of claim 1, wherein the first tooth has a chamfer angle of approximately 45°.

6. The saw blade of claim 2, wherein the first tooth has a chamfer angle of approximately 45°.

7. The saw blade of claim 1, wherein the first tooth has a first height, the second tooth has a second height and the third tooth has a third height, the first height being greater than the second height and the third height.

8. The saw blade of claim 7, wherein the first height is in a range of approximately between 0.02 mm to 0.2 mm greater than the second height and the third height.

9. The saw blade of claim 8, wherein the first height is approximately 0.03 mm greater than the second height and the third height.

10. The saw blade of claim 7, wherein the second height and the third height are approximately identical.

11. The saw blade of claim 1, wherein the group further includes a fourth unset chamfered tooth including a first chamfer and a second chamfer, the first and second chamfer extending symmetrically with respect to the longitudinal center plane.

12. The saw blade of claim 11, wherein the first tooth has a first height, the second tooth has a second height, the third tooth has a third height and the fourth tooth has a fourth height,
the first height being greater than the second height and the third height,
the fourth height being smaller than the first height, the second height and the third height.

13. The saw blade of claim 11, wherein the group further includes the following unset chamfered teeth:
a fifth tooth including a first chamfer and a second chamfer, the first and second chamfer extending non-symmetrically with respect to the longitudinal center plane, the first chamfer extending in a first direction from the longitudinal center plane and having a first chamfer angle, the second chamfer extending in a second direction from the longitudinal center plane, the second direction being different than the first direction, the second chamfer having a second chamfer angle, the second chamfer angle being less than the first chamfer angle, and
a sixth tooth including a first chamfer and a second chamfer, the first and second chamfer extending non-symmetrically with respect to the longitudinal center plane, the first chamfer extending in a first direction from the longitudinal center plane and having a first chamfer angle, the second chamfer extending in a second direction from the longitudinal center plane, the second direction being different than the first direction, the second chamfer having a second chamfer angle, the second chamfer angle being greater than the first chamfer angle.

14. The saw blade of claim 12, wherein the group further includes the following unset chamfered teeth:
a fifth tooth including a first chamfer and a second chamfer, the first and second chamfer extending non-symmetrically with respect to the longitudinal center plane, the first chamfer extending in a first direction from the longitudinal center plane and having a first chamfer angle, the second chamfer extending in a second direction from the longitudinal center plane, the second direction being different than the first direction, the second chamfer having a second chamfer angle, the second chamfer angle being less than the first chamfer angle, and
a sixth tooth including a first chamfer and a second chamfer, the first and second chamfer extending non-symmetrically with respect to the longitudinal center plane, the first chamfer extending in a first direction from the longitudinal center plane and having a first chamfer angle, the second chamfer extending in a second direction from the longitudinal center plane, the second direction being different than the first direction, the second chamfer having a second chamfer angle, the second chamfer angle being greater than the first chamfer angle.

15. The saw blade of claim 13, wherein
the first chamfer angle of the fifth tooth is in a range of approximately between 15° and 30°,
the second chamfer angle of the fifth tooth is in a range of approximately between 5° and 15°,
the first chamfer angle of the sixth tooth is in a range of approximately between 5° and 15°, and
the second chamfer angle of the sixth tooth is in a range of approximately between 15° and 30°.

16. The saw blade of claim 14, wherein
the first chamfer angle of the fifth tooth is in a range of approximately between 15° and 30°,
the second chamfer angle of the fifth tooth is in a range of approximately between 5° and 15°,
the first chamfer angle of the sixth tooth is in a range of approximately between 5° and 15°, and
the second chamfer angle of the sixth tooth is in a range of approximately between 15° and 30°.

17. The saw blade of claim 1, wherein each cutting portion includes a cutting edge and a wearing protection layer, the wearing protection layer being arranged to cover the cutting edge and at least another part of the cutting portion.

18. The saw blade of claim 17, wherein the wearing protection layer includes hard material.

19. The saw blade of claim 18, wherein the hard material is selected from the group consisting of TiN, TiCN, TiAlN, CrN and DLC.

* * * * *